US00RE37615E

(19) United States
(12) Reissued Patent
Niese

(10) Patent Number: US RE37,615 E
(45) Date of Reissued Patent: Apr. 2, 2002

(54) ANCHORED/RESILIENT HARDWOOD FLOOR SYSTEM

(75) Inventor: Michael W. Niese, Cincinnati, OH (US)

(73) Assignee: Robbins, Inc., Cincinnati, OH (US)

(21) Appl. No.: 09/266,398

(22) Filed: Mar. 10, 1999

Related U.S. Patent Documents

Reissue of:
(64) Patent No.: 5,609,000
Issued: Mar. 11, 1997
Appl. No.: 08/388,388
Filed: Feb. 14, 1995

U.S. Applications:
(63) Continuation-in-part of application No. 07/912,310, filed on Jul. 13, 1992, now Pat. No. 5,388,380.

(51) Int. Cl.[7] ..... E04B 5/00
(52) U.S. Cl. ..... 52/480; 52/508; 52/403.1; 52/393
(58) Field of Search ..... 52/480, 508, 403.1, 52/481.1, 479, 393, 346

(56) References Cited

U.S. PATENT DOCUMENTS

| | | | | | |
|---|---|---|---|---|---|
| 1,787,067 | A | * | 12/1930 | Eisler | 52/480 |
| 2,035,902 | A | * | 3/1936 | MacLeod | 52/480 |
| 3,803,791 | A | * | 4/1974 | Turnbull | 52/480 |
| 4,325,546 | A | | 4/1982 | McMahon et al. | 272/2 |
| 4,653,246 | A | * | 3/1987 | Hepler | 52/480 |
| 4,759,164 | A | | 7/1988 | Abendroth et al. | 52/403 |
| 4,819,932 | A | | 4/1989 | Trotter, Jr. | 272/3 |
| 4,856,250 | A | | 8/1989 | Gronau et al. | 52/480 |
| 4,860,516 | A | * | 8/1989 | Koller | 52/480 |
| 4,862,664 | A | * | 9/1989 | Romine | 52/480 |
| 4,884,932 | A | * | 12/1989 | Meyer | 52/480 |
| 4,890,434 | A | | 1/1990 | Niese | 52/393 |
| 4,930,280 | A | | 6/1990 | Abendroth | 52/403 |
| 5,016,413 | A | * | 5/1991 | Counihan | 52/391 |
| 5,388,380 | A | * | 2/1995 | Niese | 52/480 |
| 5,412,917 | A | * | 5/1995 | Shelton | 52/403.1 |
| 5,497,590 | A | | 3/1996 | Counihan | 52/385 |
| 5,609,000 | A | | 3/1997 | Niese | 52/480 |

OTHER PUBLICATIONS

Superior Floor Company Inc., Hard Maple Floors, A Superior Performance Stats With a Superior Floor, 09550/SUP, BuyLine 3624 and 08200/GRA, BuyLine 3245, 1992, 6 pages.
Kenai Peninsula Borough of Alaska Project.
YMCA of Groesbeck, Ohio Project.
Utah County Armory of Springvile, Utah Project.
L. A. Fitness, Inc. of Diamond Bar, California Project.

* cited by examiner

*Primary Examiner*—Beth A. Stephan
(74) *Attorney, Agent, or Firm*—Wood, Herron & Evans, LLP

(57) ABSTRACT

An anchored/resilient floor system includes at least one upper flooring layer supported by parallel rows of attachment members which are supported above a base by a plurality of compressible pads, the attachment members being secured to the base at predetermined positions thereallong by a fastener construction which permits downward deflection under loaded conditions but prevents vertical raising of the members beyond their initial static position. The attachment members are anchored in a manner which does not hold the pads in a precompressed state when the floor is unloaded. The fastener construction may include a one, two or three piece construction. The single member fastener construction is particularly suitable for reanchoring or retrofitting an already installed floor at a significantly lower cost than that of installing a new floor, and the one-piece fastener construction also may be adapted for use with a portable floor.

45 Claims, 7 Drawing Sheets

ANCHORED/RESILIENT HARDWOOD FLOOR SYSTEM

Matter enclosed in heavy brackets [ ] appears in the original patent but forms no part of this reissue specification; matter printed in italics indicates the additions made by reissue.

This application is a continuation-in-part application of applicant's U.S. patent application Ser. No. 912,310, now U.S. Pat. No. 5,388,380, entitled "Anchored/Resilient Sleeper For Hardwood Floor System", which was filed on Jul. 13, 1992, which is expressly incorporated herein by reference in its entirety.

FIELD OF THE INVENTION

This invention relates to hardwood floor systems. More particularly, this invention relates to an anchored and resilient sleeper for a hardwood floor system.

BACKGROUND OF THE INVENTION

Floor systems, particularly hardwood floor systems, are commonly supported by sleepers. Sleepers are elongated nailing members, often of wood, laid end to end in parallel rows to form a subfloor layer for supporting a layer of floorboards secured thereabove. The sleepers may be relatively narrow and spaced from each other, or the sleepers may be relatively broad with edges of adjacent rows in abutting relationship. If desired, one or more subfloor layers may be used between the wear layer and the sleepers. The sleepers support the other floor components above a base.

One recognized advantage of supporting a floor system with sleepers relates to moisture susceptibility. The components of most floor systems are made of wood. Humidity changes from season to season cause wooden components of floor systems, and particularly an upper layer of floorboards, to expand with moisture intake and contract with moisture expulsion. Because sleepers support these other components above the base, the sleepers limit moisture transfer between the base and these other components. Moreover, if the sleepers are narrow and spaced away from each other, the free space between the supported components and the base enables air to circulate air therebetween to minimize moisture transfer.

Because moisture-caused expansion and contraction of floor system components may result in buckling, it is desirable to securely anchor the floor system, particularly the sleepers, to the base below. Anchoring of the sleepers provides an acceptable level of dimensional stability for the floor system, compared to a floor system wherein the sleepers are unanchored.

It is also desirable for hardwood floor systems to provide a degree of resilience. In the context of this application, resilience generally means the ability of a floor system to absorb shock upon impact and to deflect downwardly upon impact. Particularly for hardwood floors used in athletic contests, the resilience of the floor system may play a major role in reducing the incidence of athletic injury. In short, if a floor provides some degree of give, the stress placed upon the musculoskeletal structure of the athlete is reduced.

It is common practice to provide resiliency for a floor system by locating compressible pads below the sleepers. The compressibility of the pad enables the sleepers and the floorboards thereabove to deflect downwardly. The amount of downward deflection and the shock absorption of the floor system will depend upon a number of factors, including the shape and composition of the pads.

Recent studies indicate that, while resiliency is important to the reduction of susceptibility to athletic injury, uniformity in resiliency is also critical. Thus, it is desirable to provide a floor system with a high degree of resiliency which is also uniform throughout its surface area.

Unfortunately, it has proved difficult to achieve dimensional stability, optimum resiliency and uniformity in resiliency for hardwood floors supported by sleepers. The enhancing of one of these two features commonly adversely affects the other. For instance, when sleepers are supported above the base by a plurality of compressible pads and the sleepers are fastened to the base, direct fastening of the sleeper produces some initial compression, or precompression of the pads which is greater than the normal compression due to gravity from the components located thereabove. The pads remain compressed to this state throughout the life of the floor, even when the floor is unloaded.

Because of this already compressed state, the capability of the pads for further deflection is inhibited, and the overall resiliency of the floor system is greatly reduced. Another disadvantage results from this excess precompression. Because an excessive percentage of the compressibility is "used up", the floor has a higher chance of "bottoming out" or deflecting to its maximum, upon impact from above. This occurs when the pads compress maximally to a state where the floorboards deflect into contact with the rigid fasteners. On the other hand, if the floor system is free-floating, i.e. the sleepers are not anchored securely to the base, the entire floor system may be dimensionally unstable.

While some commercially available floor systems have achieved some degree of success in addressing one or more of these concerns, such floor systems tend to have a relatively high cost due to an increase in the number or complexity of structural components required for achieving these features and the increased costs associated with shipping and installing these components. As a result, the benefits of these floor systems have been limited unnecessarily to a relatively low number of users.

It is an objective of this invention to achieve optimum dimensional stability and optimum resiliency and uniformity of resiliency for a hardwood floor system.

It is another objective of this invention to substantially improve resiliency and dimensional stability for a relatively low cost hardwood floor system.

It is still another objective of this invention to enhance the dimensional stability of a hardwood floor system without producing a corresponding loss of resiliency, or loss in uniformity of resiliency.

The objectives of this invention are achieved by a sleeper construction which utilizes an attachment or nailing member supported by compressible pads above a base and a fastening arrangement which secures the attachment members directly to the base without interacting with the pads. This fastening arrangement enables the attachment members to deflect downwardly upon impact to upper floor layers but restricts upward raising of the attachment members beyond the initial static position of the pads. More importantly, this fastening arrangement enables the attachment members to be anchored to the base in a manner which does not precompress the pads when the floor system is unloaded. Thus, this anchored/resilient sleeper provides optimum dimensional stability and resiliency.

Because the manner of anchoring the attachment members does not precompress the pads or hold them in a precompressed state, i.e. beyond the normal weight bearing compression due to components located thereabove, an even distribution of the compressible pads along the attachment members will assure a uniformly resilient, yet firmly anchored, floor system.

Additionally, because of its simplicity and relatively few number of parts, the embodiments of this invention provide anchoring, resiliency and uniformity in resiliency for a sleeper-type floor system at a low cost. Fabrication and installation of the attachment members is also simplified. Finally, because the fastening arrangement provides secured anchoring, the lengths of the attachment members may be increased if narrow, spaced attachment members are used. As a result, less waste is produced and shipping, handling and installation costs are reduced.

According to one preferred embodiment of the invention, a fastener construction is utilized which may be of one, two or three piece construction. With this embodiment, each attachment or nailing member has at least one vertical bore extending from an upper surface to a lower surface thereof. At least one compressible pad is secured to the lower surface. The vertical bore includes an enlarged-diameter upper portion and a reduced-diameter lower portion.

The three piece construction includes a sleeve, a washer and the fastener. The sleeve resides within the lower, reduced-diameter portion, with the bottom edge of the sleeve contacting the base and the top edge of the sleeve residing adjacent the upper portion of the bore. The washer resides on top of the sleeve, in alignment therewith, and the fastener extends therethrough.

According to a second variation of this first preferred embodiment of the invention, the sleeve includes an upper flange, and no washer is necessary. For both variations, a fastener extends downwardly through the flange, through the sleeve and into the base. An enlarged head at the top of the fastening pin engages and holds the washer or the flange against the bottom surface of the upper portion of the bore.

According to a third variation of the invention, the fastener arrangement may comprise a single anchor pin with an enlarged top end, or head, having a diameter greater than the bore lower portion but less than the bore upper portion, a bottom end to be driven into the base and a depth stop located between the top and bottom ends. The depth stop feature may not be necessary for some installations. The vertical distance between the depth stop and the top end is approximately equal to the combined vertical dimension of the attachment member and the pad.

For all three variations, because the outer diameter of the sleeve or fastener is less than the diameter of the reduced-diameter lower portion of the bore, upon impact from above the attachment member may deflect downwardly in an unimpeded manner. The combined vertical dimension of the: 1) sleeve and the washer (first variation); 2) the sleeve with flange (second variation); or 3) the non-embedded portion of the fastener (third variation), is equal to the combined vertical dimension of the pad and the lower portion of the bores. Thus, for all three variations, the structure provides a solid line of rigid material between its top end and the base, so that downward driving forces applied via the fastening pin do not precompress the pads.

Preferably, the vertical dimension between the top of the fastening pin and the upper surface of the nailing member is greater than the maximum compression of the pads. This ensures that, upon downward deflection of the nailing members, the fastening pin will not project above the upper surface of the nailing member to contact an above-subfloor or floorboard layer.

To produce this structure, the nailing members are cut to a desired length and to a desired width, which may be relatively narrow or relatively broad, depending upon the type of floor system. The bores are then cut vertically through the nailing members from the upper surface to the lower surface. Thereafter, the compressible pads are secured to the lower surface of the nailing member. The number of pads and bores will depend upon the lengths and widths of the nailing members and the desired orientation. With the bores cut and the pads secured, the sleepers are ready for shipping to the job site. Alternately, if desired, these two latter steps may be performed at the job site.

To install this structure, multiple nailing members are laid end to end in parallel rows, with the spacing between the rows dependent upon the widths of the nailing members, and also dependent on whether any open space is necessary between adjacent rows. The pads support the members above the base. If the nailing members are panel-type, there will be some spacing between adjacent rows. If desired, every other nailing member in each row may offset laterally. If using the first or second variation, the sleeves and washers, or sleeves with flanges, are then placed within the bores. Subsequently, fastening pins are driven through the sleeves, or through the sleeve and washer, and then into the base below. For the third variation, the fasteners are driven into the base without prior placement of the sleeves and/or washers.

Alternatively, holes may initially drilled into the base, as by extending a drill bit through the bores, and then the fastening pins may be driven into the drilled holes, This eliminates the possibility of cracking of the base, which may occur upon impact when pre-drilled holes are not used. When fully extended, the head ends of the fastening pins engage either the top surfaces of the washers, the top surface of the flanges or the nailing member itself, depending upon which construction is used. In this manner, the heads of the fastening pins hold the bottoms of the counterbores in the nailing members.

Because the sleeve and washer, the sleeve with the flange, or the fastener alone, does not compress vertically during installation, the fastener structure bears all the vertical force during installation. As a result, driving of the fasteners into the base does not vertically compress the pads. Moreover, after installation, when the floor system is unloaded, the pads are not held in a compressed state, i.e. beyond the compression due to normal weight bearing of components thereabove. Accordingly, after installation, the compressible pads retain their maximum compressive capability, thereby providing optimum resiliency potential throughout the floor system.

With the single piece anchor pin construction, after drilling the holes in the base, the anchor pins are extended through the bores and driven directly into the holes in the base to achieve secured engagement therein. The depth stops limit downward movement of the anchor pins to position the top ends thereof at a predetermined vertical distance above the base, this predetermined distance being equal to the combined vertical dimension of the pads and the lower portions of the bores of the attachment members.

The upper flooring layers are then secured to the tops of the nailing members. According to one preferred construction, at least one subfloor of panels is secured to the relatively narrow nailing members, and then tongue-and-groove maple floorboards are secured to the uppermost layer of panels. Because of the combination of anchored and resilient nailing members, along with the one or more layers of panels, this particular floor construction provides resiliency with a high degree of uniformity through its entire surface area. As indicated previously, recent studies suggest that, in addition to resiliency, uniformity of resiliency also plays a critical role in reducing athletic injury on athletic floor systems and enhancing performance.

Alternatively, the floorboards may be secured directly to the nailing members. This embodiment may be desirable if only one subfloor layer of wide, panel-type nailing members is utilized, or even if one layer of relatively narrow, spaced rows of attachment members is used. As still another alternative, if desired, the upper flooring layer may comprise one or more wood or non-wooden layers, depending upon the primary commercial use of the floor system.

Because of the relatively few number of parts and simple construction, this inventive structure provides conventional stability, resiliency and uniformity in resiliency for a hardwood floor system at a relatively low cost, compared to prior anchored and resilient sleeper-type floor systems.

Additionally, with the third variation of the invention, an already installed free floating floor or an anchored floor supported on resilient pads may be easily retrofitted or repaired to securely anchor the attachment members to the base in a manner which accomodates downward deflection but no vertical rising.

The invention contemplates several additional features applicable to all of the embodiments, such as "slicing" the attachment members horizontally to use a stacked or two-component attachment member. This eliminates the need to mill a two diameter bore, and it also provides an additional degree of versatility in constructing and arranging the subfloor.

These and other features of the invention will be more readily understood in view of the following detailed description and the drawings.

DETAILED DESCRIPTION OF THE DRAWINGS

Figure 1:
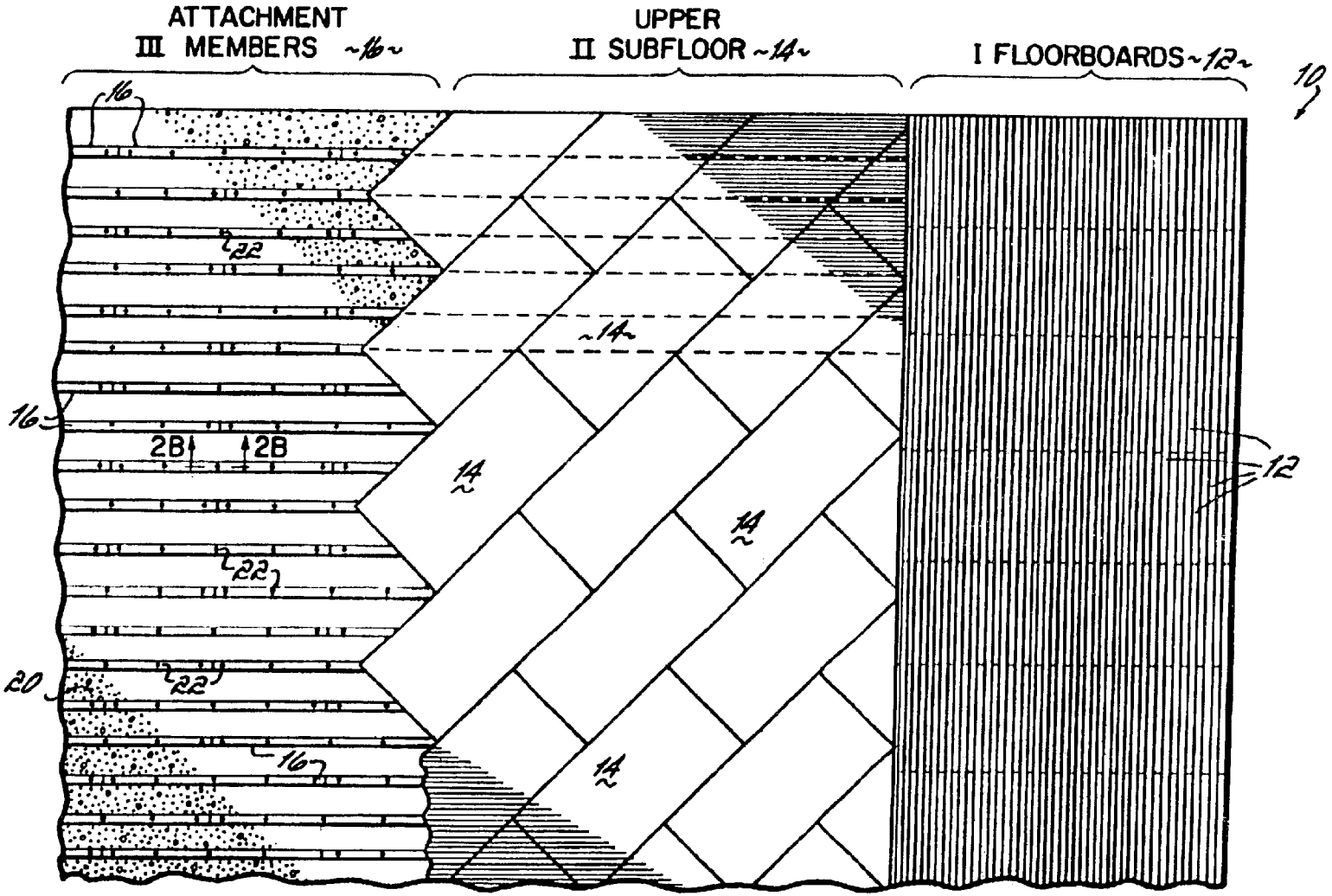
FIG. 1 is a plan view which illustrates a hardwood floor system according to a first preferred embodiment of the invention, wherein the attachment members are relatively narrow.

FIG. 1 is a plan view which depicts, in section, a hardwood floor system 10 in accordance with a first preferred embodiment of the invention. The floor system 10 includes a plurality of floorboards 12 (Section I), an upper subfloor comprising a layer 14 of panels underlying and supporting the floorboards 12 (Section II), a plurality of nailing or attachment members 16 laid end to end in parallel rows to support the nailing or attachment members 16 above a base 20 (Section III). The construction of this floor system 10 generally includes the pads 18, the nailing members 16 and the structural components which anchor the nailing members 16 to the base 20.

Typically, for athletic floors, the floorboards 12 are tongue and groove maple floorboards, as is well known in the industry. If desired, the floorboards 12 may have kerfs in their bottom surfaces. Kerfing the floorboards 12 provides breaks or discontinuities in the floor system 10 which will effect the impact response frequency and impact deflection attenuation within a reduced surface area. The floorboards 12 are secured by nails (as in FIG. 3) to the subfloor layer 14. The subfloor layer 14 is preferably formed from a plurality of 4'×8' plywood panels having a uniform thickness of about ½ inch. The nailing members 16 depicted in FIG. 1 are wood, with cross sectional height and width dimensions of about 1½" and 2½" respectively, and a length of either 4 feet or 8 feet. In the past, the spacing for the parallel rows of this type of nailing member 16 has been about 12", although it is to be understood that the spacing may vary depending upon the widths of the nailing members 16. If the nailing members 16 have a greater width, and/or are panel-type, there may be relatively little spacing between adjacent rows.

According to one aspect of the invention, the lengths of the nailing members 16 of the type shown in FIG. 1 may be increased to about 8' and the spacing between the rows of nailing strips 16 may be increased to about 15" to 17". The pads 18 shown in FIGS. 1 and 2 are described in applicant's co-pending application, U.S. Ser. No. 857,232 filed on Mar. 25, 1992, and entitled "Prefabricated Sleeper For Anchored and Resilient Hardwood Floor System". However, it is also to be understood that the advantageous features of this invention could be achieved with any one of a number of pad types, as long as the pads 18 support the nailing members 16 in spaced relation above base 20, and so long as the pads 18 are compressible.

The primary feature of the invention relates to anchoring the nailing members 16 to the base 20 in a manner which permits downward deflection and prevents vertical raising but does not substantially precompress the pads 18 during unloaded conditions. Because the nailing members 16 are downwardly deflectable but not vertically raisable, the floorboards 12 and the subfloor layer 14, or any alternative upper flooring layer supported by the nailing members 16, are also downwardly deflectable but not vertically raisable.

Figure 2A:
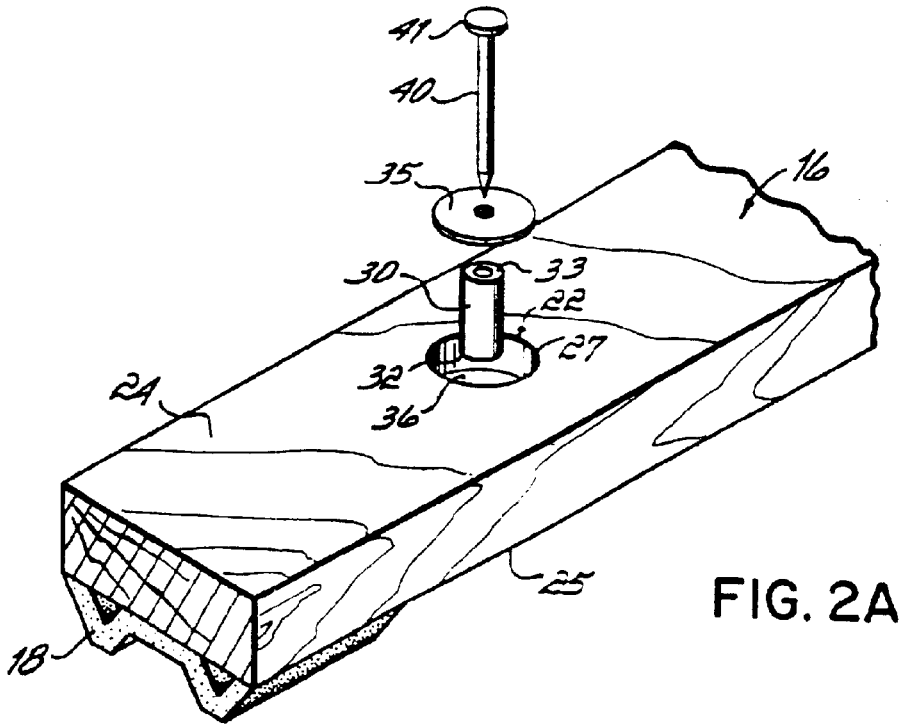
FIG. 2A is a disassembled perspective showing the fastener arrangement for a hardwood floor system constructed in accordance with a first preferred embodiment of the invention.
Figure 2B:
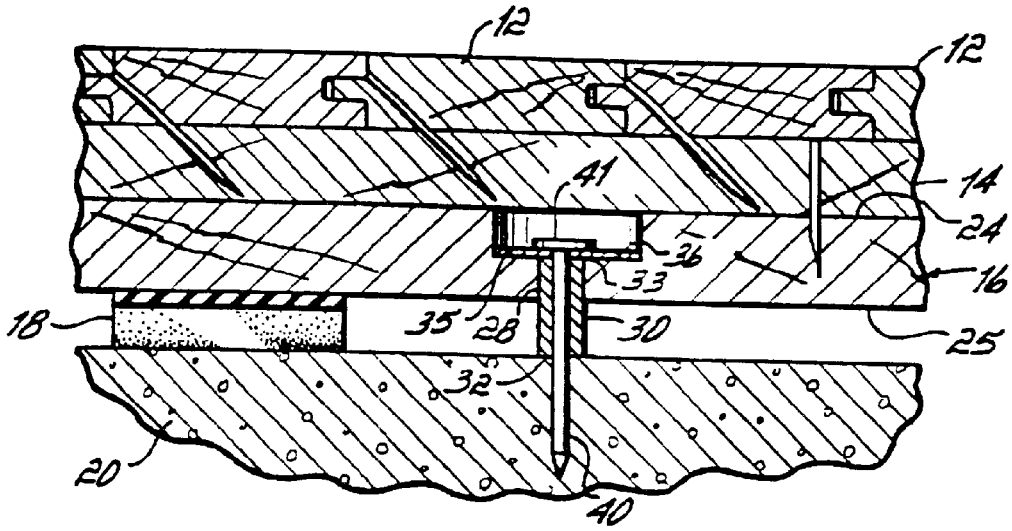
FIG. 2B is a cross-sectional view taken along lines 2B—2B of FIG. 1.

To accomplish these features, each nailing member 16 has at least one bore 22 extending vertically therethrough from an upper surface 24 to a lower surface 25, as shown in FIG. 2A and FIG. 2B. Each bore 22 has an enlarged-diameter upper portion 27 and a reduced-diameter lower portion 28. Upper portion 27 has a preferable diameter of about 1⅛", and lower portion 28 has a preferable diameter of ⅝". Preferably, the vertical dimension of the upper portion 28 is about ½"–¾", and the vertical dimension of the lower portion is about ¾"–1". Preferably, the bores 22 are spaced laterally away from the pads 18, though this is not critical or necessary.

For a thin nailing member 16 which is 4' long, it is preferable to use two bores 22, with the nailing member 16 supported by five pads spaced equidistantly along the entire length of the nailing member 16. For a nailing member which is 8' in length, it is preferable to utilize three bores 22, with nine pads spaced equidistantly along the length of the nailing strip 16. However, it is also to be understood that the number of bores 22 and/or pads 18 may be varied and reoriented, depending upon the use of the floor system 10 and the structural composition of the upper subfloor layer or layers. More particularly, if the nailing members 16 are panel-type, with a width of up to four feet, each nailing member 16 may include up to four rows of bores 22 and pads 18.

To anchor the nailing members 16 to the base 20, according to a first variation of the first preferred embodiment, as shown in FIG. 2B, a sleeve 30 is located within the reduced-diameter lower portion 28 of each of the bores 22. The sleeve 30 has a bottom edge 32 which contacts the base 20 and a top edge 33 located adjacent the enlarged-diameter upper portion 27. The outer diameter of the sleeve 30 is preferably about 9/16", so that the nailing member 16 may deflect downwardly without frictionally engaging the sleeve 30. A washer 35 rests upon the top edge 33 of the sleeve 30. The washer 35 is coaxial with the sleeve 30, and a peripheral portion of the washer 35 rests upon a horizontal surface 36 of the nailing member 16 which defines the bottom of upper portion 27. The washer 35 has an inner diameter which is less than the diameter of the sleeve 30 and greater than the diameter of the anchor pin 40.

Figure 2D:
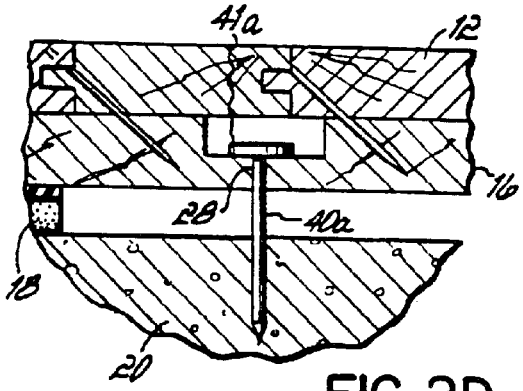
FIG. 2D is a cross-sectional view, similar to FIG. 2B, showing another variation of the first preferred embodiment of the invention, a one-piece fastener arrangement.
Figure 2C:
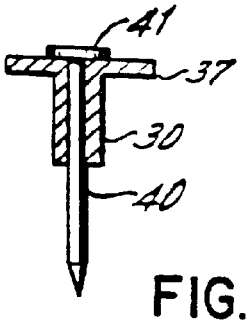
FIG. 2C is an elevational view which depicts a two-piece variation of the fastener arrangement.

According to a second variation of this embodiment, as shown in FIG. 2C, the sleeve 30 includes an integrally-formed upper flange 37 at the top end thereof. The combined vertical dimension of the sleeve 30 with the flange 37, or the sleeve 30 and the washer 35, is substantially equal to the combined vertical dimension of the pad 18 and the lower portion 28.

For either embodiment, a fastening pin 40 extends downwardly through sleeve 30 and into the base 20, as shown in FIG. 2B. Pin 40 has an enlarged head 41 at a top end thereof which tightly engages and holds the washer 35, or the sleeve 30 and the flange 37, against surface 36, thereby tightly securing the bottom edge 32 of the sleeve against the base 20. In this position, the head 41 of the pin 40 prevents upward movement of the sleeve 30 and the washer 35, or the flange 37. The pin 40 also cooperates with the washer 35 or the sleeve 30 and the flange 37 to hold the nailing member 16 in a secured, anchored position with respect to the base 20, so that the nailing member 16 cannot raise upwardly therefrom. Additionally, due to the relative diameter of the sleeve 30 with respect to lower portion 28, and due to the sleeve 30 with respect to lower portion 28, and due to the compressibility of the pads 18, the nailing members 16 are downwardly deflectable upon impact to the floorboards 12.

Anchoring of the nailing members 16 with the pin 40 and sleeve 30 combination provides dimensional stability for the nailing members 16 and the entire floor system 10. The downward deflectability of the nailing members 16 also provides resiliency for the entire floor system 10. In addition, this invention optimizes the resiliency of the compressible pads that are utilized. The interrelationship of the bore 22, the washer 35, the sleeve 30 and the surface 36 anchors the nailing members 16 in a manner which does not hold the pads 18 in a precompressed state when the floor system 10 is unloaded. Finally, because of the uniform distribution of the pads 18 and the pins 40, the floor system 10 is highly uniform in resilient response characteristics.

To further enhance the ability of the floor system 10 to withstand horizontal movement due to moisture intake or egress, the diameters of the bores 22 may be oversized with respect to the sleeve 30.

During installation, the sleeve 30 and the washer 35, or the sleeve 30 and the flange 37, bear the downward compressive force applied when the pin 40 is driven vertically downward. The pads 18 are sufficiently isolated from the downward force so that they are not precompressed. As a result, the floor system 10 provides optimum resiliency characteristics for whatever type of compressible pad is used.

FIG. 2D shows another variation, a more basic approach which contemplates a one-piece fastener structure, as opposed to a two-piece or three-piece construction. With this approach, the fastener 40a alone extends through the attachment member 16. Preferably, the fastener 40c does not bear against the attachment member 16 within the lower portion of the bore 28.

To manufacture an anchored/resilient sleeper according to the invention, the nailing members 16 are cut to the desired height, width and length dimensions. As indicated previously, if narrow sleepers are desired, the nailing members 16 may be cut in 4', 8' or even 12' lengths. Several benefits are achieved with these longer lengths. The amount of wasted material is reduced, and shipping, handling and installation costs are decreased. The bores 22 are then cut vertically through the nailing members 16, from upper surface 24 to lower surface 25, and the pads 18 are secured to the lower surface 25. The pads 18 may be adhered by gluing or mechanically fastened by stapling.

At the job site, the nailing members 16 are laid end-to-end in parallel rows, preferably with staggered ends and with the pads 18 contacting the base 20. Due to the anchored, dimensional stability provided by the pins 40 and the sleeves 30, the spacing between the rows of attachment members 16 may be increased from the prior commonly used dimension of 12" up to about 15", or even 18" or 24", or possibly higher, if a subfloor layer of panels 14 is also used. As a result of this increased spacing, the cost of the nailing members 16 per unit surface area of the floor is reduced.

With the nailing members 16 in place, the sleeves 30 are placed within the bores 22. The washers 35 may then be placed on the top edges 33 of the sleeves 30. If sleeves 30 with flanges 37 are used, no washers 35 are necessary. The pins 40 are then extended through the sleeves 30 and driven into the base 20. This latter step may be performed with a nail gun or manually. As mentioned previously, holes in the base 20 may be predrilled, prior to driving the pins 40. When driven in, the heads 41 of the pins 40 engage the washers 35, or the flanges 37, thereby causing the washers 35 or flanges 37 to tightly engage the horizontal surfaces 36 and causing the bottom edges 32 of the sleeves 36 to engage the base 20 firmly and anchor the nailing member 16 to the base 20.

In this position, the washers 35 or flanges 37 prevent vertical raising of the nailing members 16, and the relative diameters of the sleeves 30 and the lower portions 28, along with the compressibility of the pads 18, enable the nailing members 16 to deflect downwardly upon impact from above. Moreover, the pads 18 are neither precompressed during installation nor held in a precompressed state as a result of installation. Rather, the pads 18 are held between the nailing members 16 and the base 20 in a substantially uncompressed state. Thus, the floor system 10 allows optimum resilient performance for the pads 18, regardless of the type of compressible pad that is used.

After installation of the nailing members 16, the upper layer 14 of panels may be secured thereto. A layer of floorboards 12 is then secured to the subfloor layer 14 of panels. Because the vertical distance between the top of pin 40 and the top of the nailing member 16 is greater than the maximum vertical compression of the pads 18, the pin 40 cannot contact the bottom of the subfloor layer 14 when force is applied from above, even under very heavy loads. This prevents "bottoming out" of the floor system 10 upon impact, thereby avoiding interference by the anchor pins 40 with the action of the floor system 10.

Figure 4A:
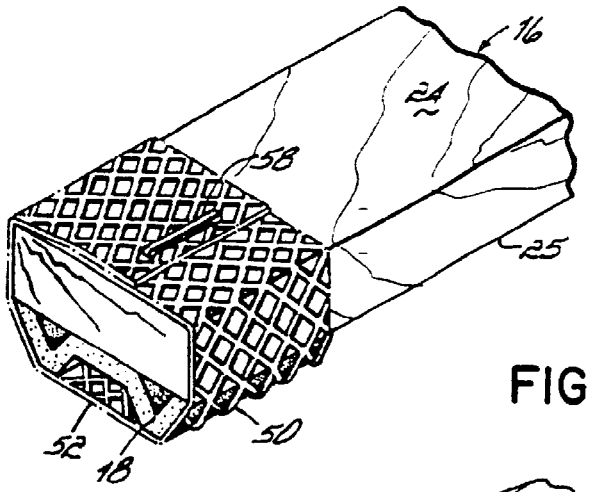
FIG. 4A is a perspective view which depicts another alternative embodiment of the invention which is particularly suitable for use with relatively narrow attachment members.

This invention also contemplates alternative structures and methods for providing a resilient and anchored attachment strip supported by compressible pads held in a substantially noncompressed state when unloaded. One such alternative is shown in FIG. 4A and involves the use of predetermined lengths of a semi-rigid, but flexible, member 50, such as mesh, graphite tissue, film glass or wire mesh wrapped around the relatively narrow nailing strips 16 and pads 18.

According to this embodiment, a central portion 52 of each of the lengths 50 of mesh spring steel is adhered or mechanically fastened to the base 20 in an orientation which is perpendicular to the direction of the nailing strips 16. The nailing strip 16 is then laid upon the base 20 with each of the compressible pads 18 supported on a centrally-adhered portion 52 of one of the lengths 50 of mesh spring steel. Opposite ends of the members 50 are then wrapped snugly around the nailing strip 16 and secured in place by one or more nails or staples 58 and/or adhesive driven into the upper surface 24 of the nailing strip 16.

When wrapping the member 50 around the pad 18 and the nailing strip 16, care must be taken to assure that the pads 18 will not be held therebetween in a compressed state. Although the pads 18 may become compressed somewhat during driving of the staples or nails to secure the wrapped ends of the member 50, the pads 18 will be able to rebound immediately thereafter, before the upper floor system components are secured to the nailing strips 16. In short, the pads 18 will allow downward deflectability, and the snugness of the secured members 50 will prevent upward raising, but the pads 18 will not be held in precompressed state when the floor system 10 is unloaded.

Although this alternative embodiment of the invention has been described with respect to a member 50 of mesh spring steel, it is also to be understood that other flexible, high strength material would also prove suitable. Also, the mesh may be located away from the pads 18.

Figure 3A:
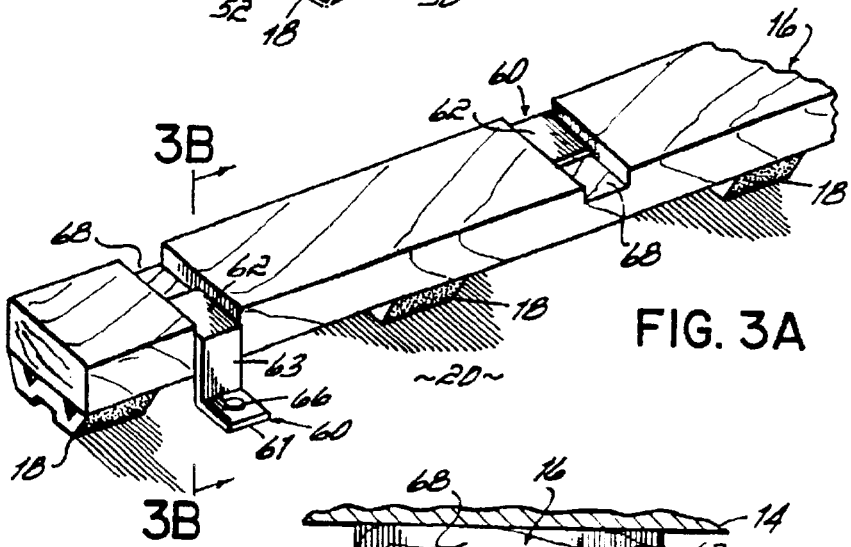
FIG. 3A is a perspective view which depicts an alternative embodiment of the invention which is particularly suitable for a floor with a relatively narrow attachment member.
Figure 3B:
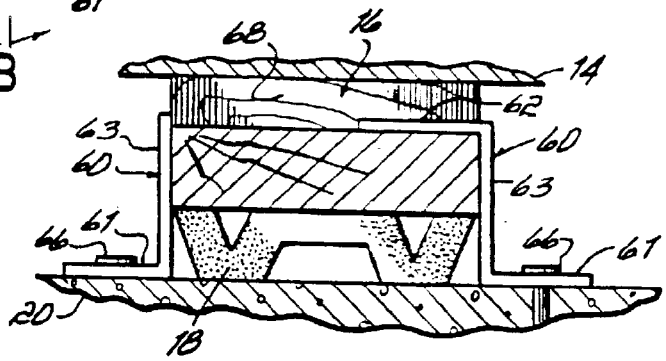
FIG. 3B is a cross-sectional view taken along lines 3B—3B of FIG. 3A.

According to another embodiment of the invention, as shown in FIGS. 3A and 3B, the attachment strips 16 are held to the base 20 by a plurality of spaced clips 60. Each of the clips 60 has a first section 61 spaced from a second section 62, with a rigid section 63 located therebetween. Preferably, first and second sections 61 and 62 are parallel with each other. First section 61 is fastened to the base 20 by a pin 66, or by adhesive. The second section 62 contacts a top surface of the attachment strip 16, but is positioned within a recess or notch 68 in the upper surface 24 of the attachment strip 16. One clip 60 is used for each notch 68. The vertical dimension of the rigid third section 62 is equal to the vertical dimension of the pad 18 plus the vertical dimension of the attachment strip 16 at the notch 68. Preferably, the depth of the notch 68 is greater than the vertical compressibility of the pads 18 so that the floor system 10 will not bottom out under heavy loads. Preferably, as shown in FIG. 3A, every other clip 60 is located on an opposite side of the attachment strip 16.

Figure 4B:
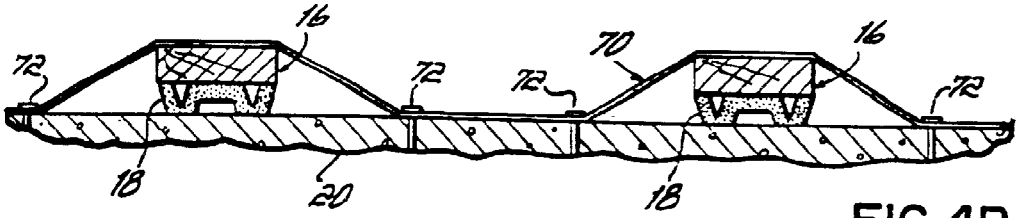
FIG. 4B is a cross-sectional view which depicts still another alternative embodiment of the invention which is particularly suitable for relatively narrow attachment members.

According to still another alternative embodiment of the invention, as shown in FIG. 4B, the attachment strips 16 are held to the base 20 by a plurality of overlying, transversely oriented bands 70. Preferably, the bands 20 are metal, though other materials would also work. On opposite sides of the attachment strip 16, the bands 70 are fastened to the base 20 by pins 72. The bands 70 are fastened in such a manner that the attachment strips 16 may deflect downwardly upon impact, but are not permitted to raise upwardly beyond the initial static position of the floor system 10.

If desired, the bands may extend all the way across the surface area to be covered by the floor system 10. According to this variation, the bands 70 would extend across the tops of all of the attachment strips 16 of the floor system 10.

For all of the above-described embodiments, the attachment strips 16 are held to the base 20 in a manner which permits downward deflection, but prevents upward movement beyond the initial static position of the pads 18 when the floor system 10 is unloaded. Additionally, for all of the embodiments, the attachment strips 16 are held to the base 20 at spaced, predetermined locations along the lengths thereof, and in a manner which does not result in a holding of the pads 18 in a precompressed condition.

Figure 5:
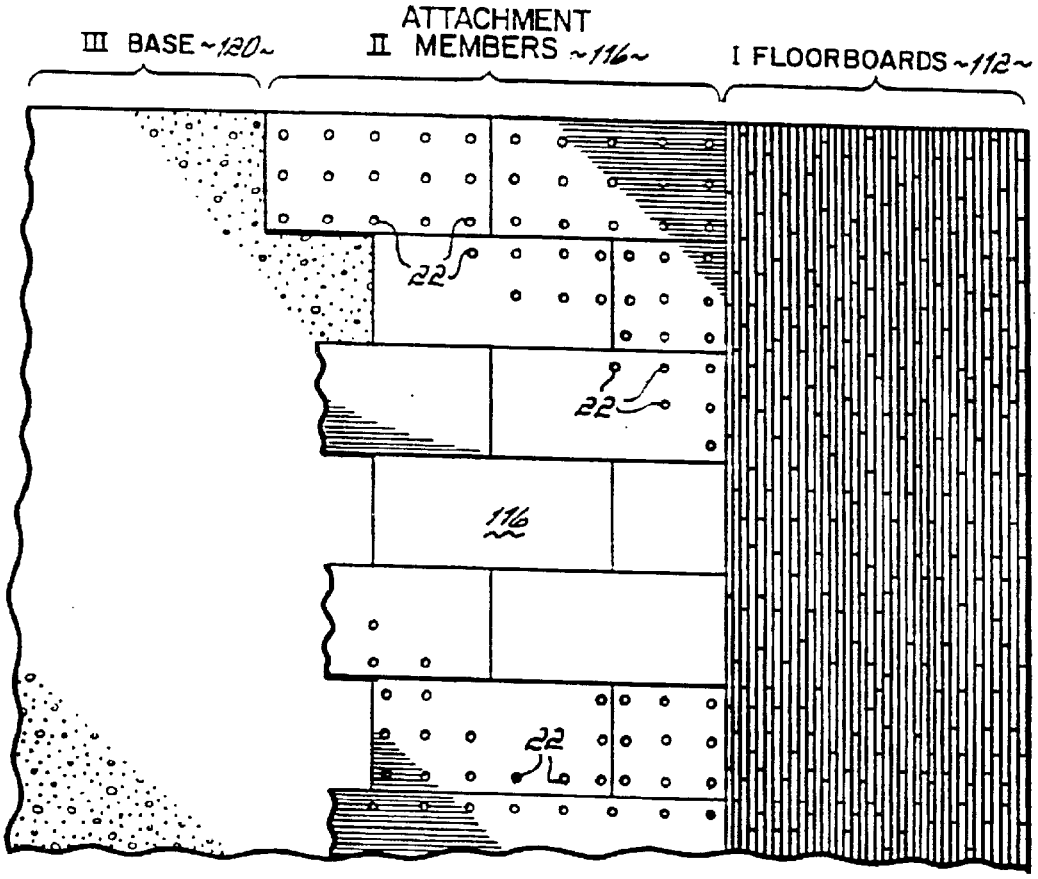
FIG. 5 is a plan view, similar to FIG. 1, which illustrates a hardwood floor system according to a second preferred embodiment of the invention, wherein the attachment members are relatively broad.
Figure 6:
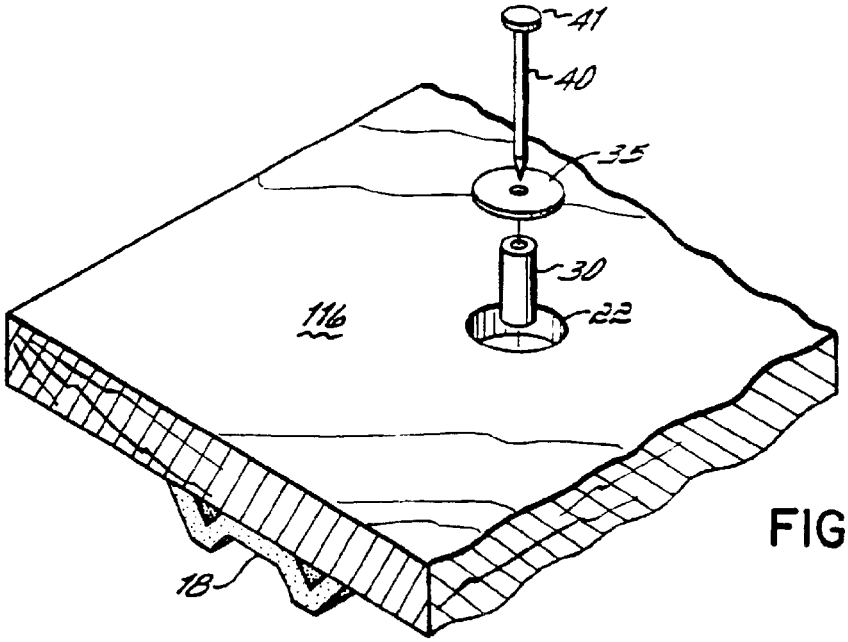
FIG. 6 is a disassembled perspective, similar to FIG. 2A, showing the anchoring means for a hardwood floor system constructed in accordance with a second preferred embodiment of the invention.
Figure 7:
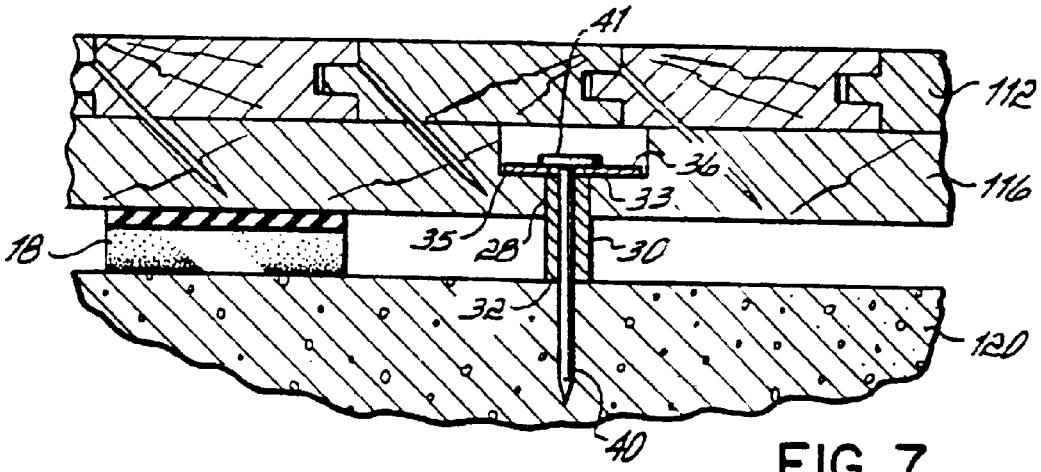
FIG. 7 is a cross-sectional view, similar to FIG. 2B, of the hardwood floor system shown in FIGS. 5 and 6.

FIG. 5, 6, and 7 show a floor system constructed in accordance with a second preferred embodiment of the invention. More specifically, FIG. 5 shows floorboards 112 overlying and secured directly to sleepers, or attachment strips 116, which are supported above the base 120 by pads 18. FIGS. 6 and 7 show additional details of this floor system. In this embodiment, the attachment members 116 are laid end to end in parallel rows with edges of adjacent rows closely spaced so that the attachment members 116 act as a subfloor layer of panels. This embodiment provides a stable anchored and resilient floor system at a relatively low cost and with a relatively low profile.

Figure 8:
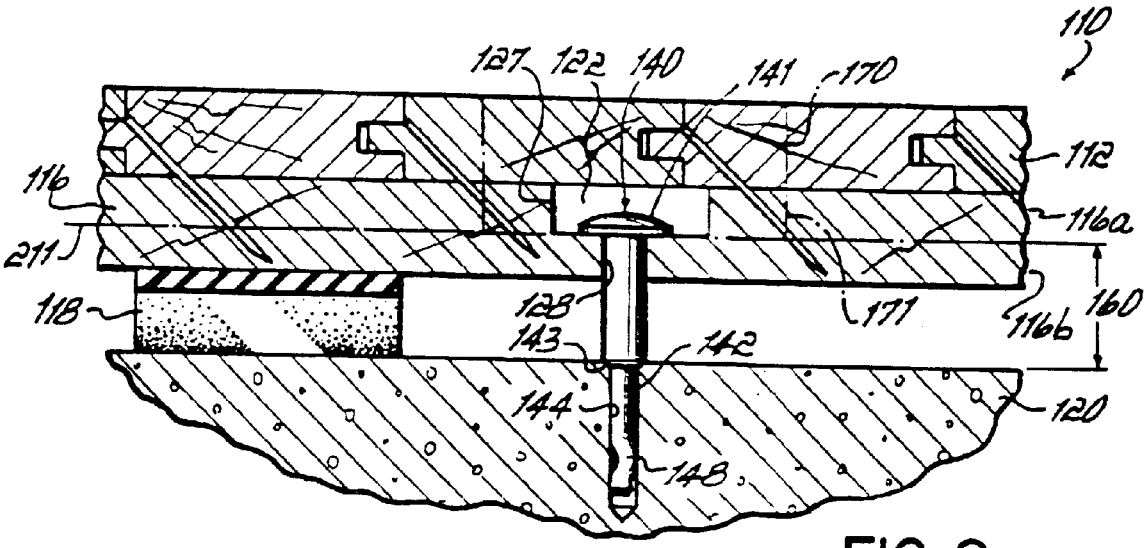
FIG. 8 is a cross-sectional view, similar to FIGS. 2B and 7, which depicts a single piece fastening arrangement for anchoring the attachment members to a base, in accordance with a variation of the invention applicable to the other embodiments.

FIG. 8 shows a variation of the invention applicable to the other embodiments. In this variation, the fastener arrangement, or anchoring means, comprises a single-piece anchor pin 140 with a head 141 at a top end thereof, a bottom end 142 adapted to be driven into the base 120 and a depth stop 143 located therebetween. The depth stop 143 is oversized with respect to a predrilled hole 144 in the base 20, thereby to limit downward movement of the anchor pin 140 and to secure the head 141 a predetermined vertical distance 160 above the base 120. In effect, with this variation the depth stop 143 serves the same purpose as the sleeve in the two-piece and three-piece arrangements, by limiting downward movement during installation. As with the other embodiments, for this embodiment the predetermined distance 160 is approximately equal to the combined vertical dimension of the lower portion 128 of the bore 122 and the pads 118 when in an uncompressed state. Preferably, the anchor pin 140 has an expansion curve 148 located adjacent the bottom end 142 to enhance securement to the base 120.

Figure 9:
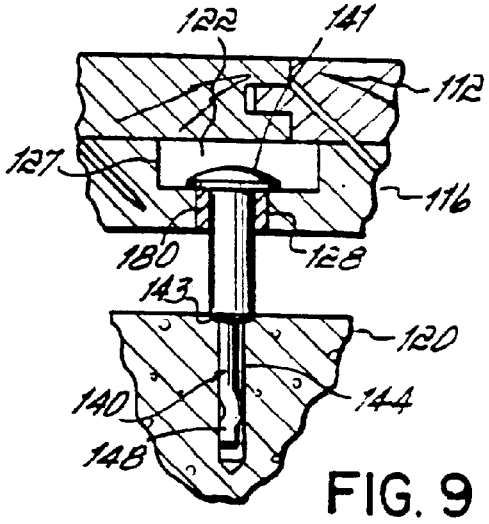
FIG. 9 is a cross-sectional view, similar to FIG. 8, which shows another feature of the invention which is applicable to all of the embodiments.

For all of the fastener arrangements of this invention, frictional engagement between the lower subfloor and the fasteners or anchoring pin 140 may be reduced by using a cylindrical lubricating sleeve 180, therebetween, as shown in FIG. 9. This sleeve 180 may be of teflon or any other low-friction material. The sleeve 180 may also include an upper flange (not shown). Applicant has used a teflon sleeve 180 with side walls having a thickness of 0.08". Alternatively, a liquid lubricant may be applied between the anchor pin 140 and the inside surface of the lower portion 128 of the bore. This reduction in friction reduces squeaks in the floor system 110 during downward deflection.

The one-piece fastener construction simplifies the structure and installment needed to anchor a resilient floor system in the manner desired, i.e., with the upper surface layer 112 and the subfloor 116 downwardly deflectable but prevented from raising upwardly. This variation eliminates the step of placing a flanged sleeve or a sleeve and washer in the bores 122 prior to driving the fastening members 140.

Another advantage that results from this one-piece fastening arrangement relates to reduced installation costs. If desired, regardless of the length and width dimensions of the attachment members 116, the upper portions 127 of the bores 122 may be predrilled at the factory in an upper portion 116a of each attachment member 116. This eliminates the need to perform this labor step at the job site. The lower portions 128 of the bores 122 could then be drilled in a lower portion 116b of each of the attachment members 116, simultaneously with drilling of the base 120. In FIG. 8, the upper portion 116a and the lower portion 116b are defined by horizontal line 211.

Additionally, if desired, the attachment members can actually include two separate layers or pieces which are stacked and then fastened together at the job site. This is demonstrated in FIG. 10, wherein the portion 116a residing above line 211 is separately formed as a top piece and the portion 116b residing below line 211 is separately formed as a bottom piece. In this manner, each of these two separate layers 116a and 116b may be predrilled at the factory. At the job site, the layers 116a and 116b are stacked in alignment and then fastened along line 211, as by adhesive staples, mechanical fastener, etc., to form a composite attachment member 116 with a plurality of two portion bores 122 formed therethrough. This feature of a dual component, "stacked" attachment member is also applicable to the embodiments shown in FIGS. 3A, 3B, 4A and 4B.

Figure 10:
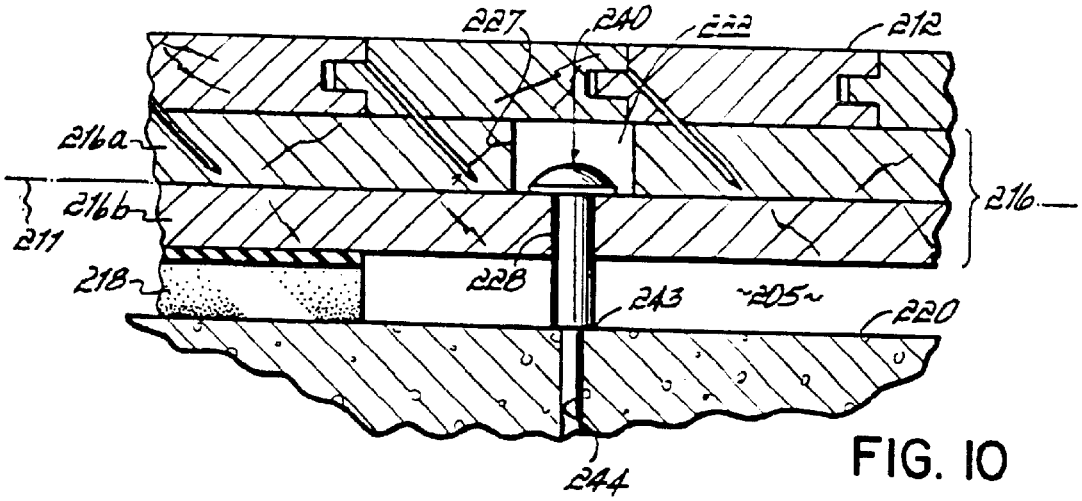
FIG. 10 is a transverse cross-sectional view, similar to FIG. 8, which shows a single piece fastener arrangement in combination with an attachment member which comprises two separate, layered pieces, another feature which is applicable to all of the embodiments.
Figure 10A:
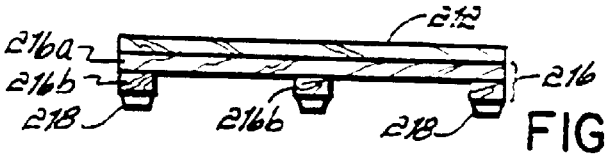
FIG. 10A is transverse cross-sectional view which shows another subfloor structure which may be used with the single piece fastening arrangement, separate layered pieces of different dimension.
Figure 10B:
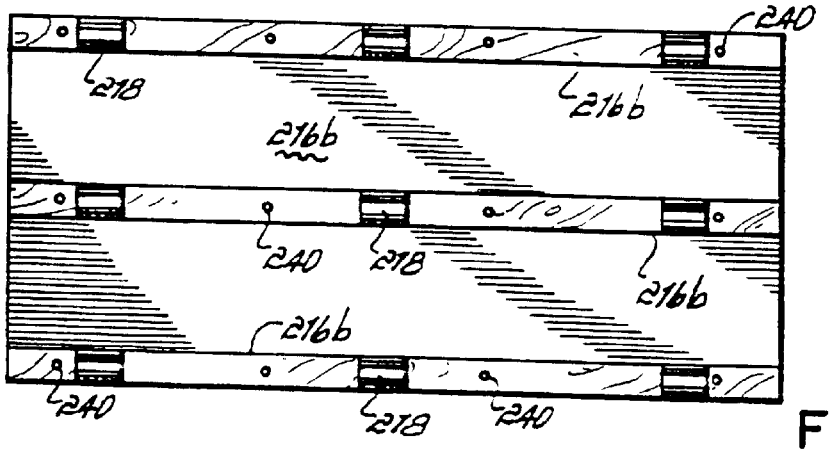
FIG. 10B is a bottom view of the subfloor structure of FIG. 10A.

FIGS. 10A and 10B depict another variation of this embodiment of the invention. According to this variation, the subfloor 216 comprises an upper layer 216a of panels supported by a lower layer 216b of spaced rails. The upper portions 227 of the bores 222 are formed in the panels, preferably at the factory, while the lower portions 228 of the bores 222 may be either predrilled at the factory or formed simultaneously with forming the holes 244 in the base 220, prior to driving of the anchor pins 240 therein.

This structure also eliminates the labor costs associated with drilling multiple two portion bores 222 through the subfloor 216 at the job site. Additionally, the use of an upper layer 216a of panels and a lower layer 216b of spaced rails provides some open volume 205 between the upper layer 216a of panels and the base 220, a feature which promotes drying out of the floor 210 if moisture problems happen to arise.

Figure 12:
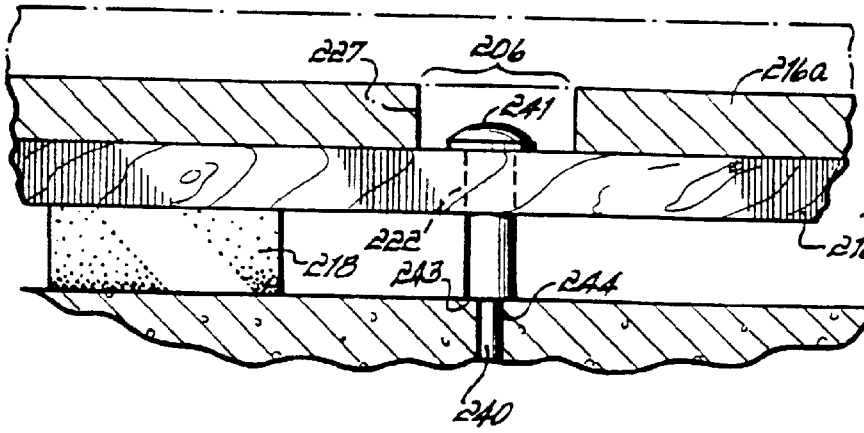
FIG. 12 is a cross-section taken along lines 12—12 of FIG. 11.
Figure 11:
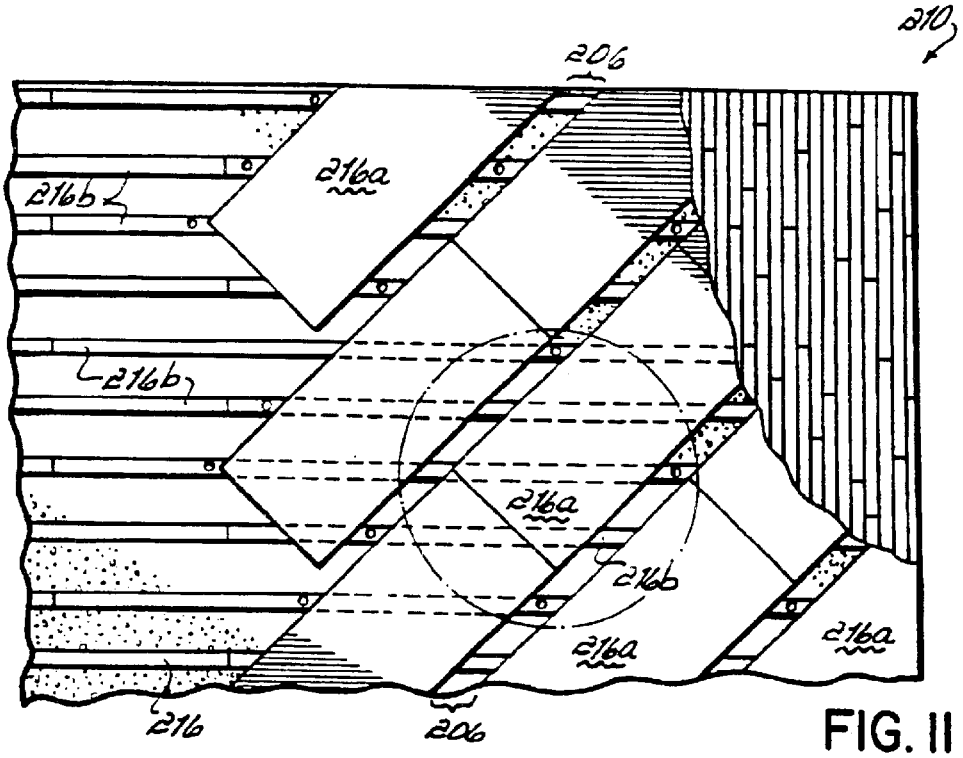
FIG. 11 is a plan view which shows yet another version of the single piece fastening arrangement shown in FIG. 8.

FIGS. 11 and 12 show a further variation of the floor system shown in FIGS. 10, 10A and 10B. More specifically, FIG. 11 shows a subfloor 216 which comprises an upper layer 216a of panels and a lower layer 216b of spaced rails. In each row of panels, adjacent panels have the standard industry spacing required for panel-type subfloors, i.e., ¼–¾ inch. Adjacently situated rows of panels are spaced away from each other by a distance designated 206, a predetermined distance which is preferably in the range of about 4–12 inches. This distance is slightly exaggerated in FIG. 11. Also, the joints of the adjacently located rows of panels are staggered, and the panels 216a are oriented at an acute angle with respect to the rails 216b. No bores are formed or drilled through the panels 216a. Rather, the spacing 206 between adjacently situated rows forms or defines the "upper portion" 227 of the bores 222, with each of the lower portions 228 of the bores 222 formed through the rails 216b and located in vertical alignment with an open space 206 between two rows of panels. This structure reduces costs associated with forming or drilling upper bore portions 227 through the upper subfloor layer of panels 216a.

Additionally, if it is desired to have the floor system 210 act as a free floating floor, at least within reduced area regions, not all of the rails of the lower layer 216b are secured to the base 220. These unsecured rails "float" above the base 220, in contact therewith via pads 218 but not anchored thereto. This structure isolates the unsecured rails located between secured rails and causes the floor within each of these reduced area sections to act in a free floating manner.

This one-piece fastener variation of the invention is particularly suited for retrofitting, or reanchoring, an installed resilient floor system which has been in use for an extended period of time. To do this, at each location of securement, a circular plug may be cut into the upper layer and all subfloor layers but the bottommost layer, as outlined in phantom by reference numeral 170 in FIG. 8. The plug 170 is then removed therefrom to access the bottommost subfloor layer, (attachment number 116, in this case) which is supported above the base 120 by pads. In FIG. 8, the pads are designated by reference numeral 118, though it is to be understood that the actual construction and vertical dimension of the supporting pads will vary from job to job. A two portion bore is then formed in the lowermost subfloor layer 116, preferably by drilling. The bore 122 is similar in configuration to the bore 22 shown in FIGS. 2 and 6. A hole 144 is then drilled in the base 120, and subsequently, an anchor pin 140 is extended through the bore 122 and driven into the base 120 to a depth determined by the depth stop 143. The plug 170 is then replaced in the floorboards 112. This reanchors the floor in a manner which allows downward deflection but no vertical raising.

Alternatively, if more than one subfloor layer is used, and a plug 170 is removed from an upper subfloor layer 116a, only the reduced diameter portion 128 of the bore is formed in the lowermost subfloor layer 116b. After driving the anchor pin 140, the plug 171 for the subfloor layer 116a directly above the lowermost subfloor layer 116a is not replaced. This creates, in effect, a two diameter portion bore 122.

The correct vertical position of the depth stop 143 relative to the head 141 may be determined by studying the specification for the installed floor or by actual measurement. With this dimension known, customized anchor pins 140 may be readily manufactured to re-anchor the floor, simply by raising or lowering the position of the depth stop with respect to the head and the bottom end of the pin.

Because the vertical dimensions of the fastening means may be varied as needed, the floor system of this invention more readily accommodates an uneven base, i.e., a base which requires substantial shimming.

Figure 13:
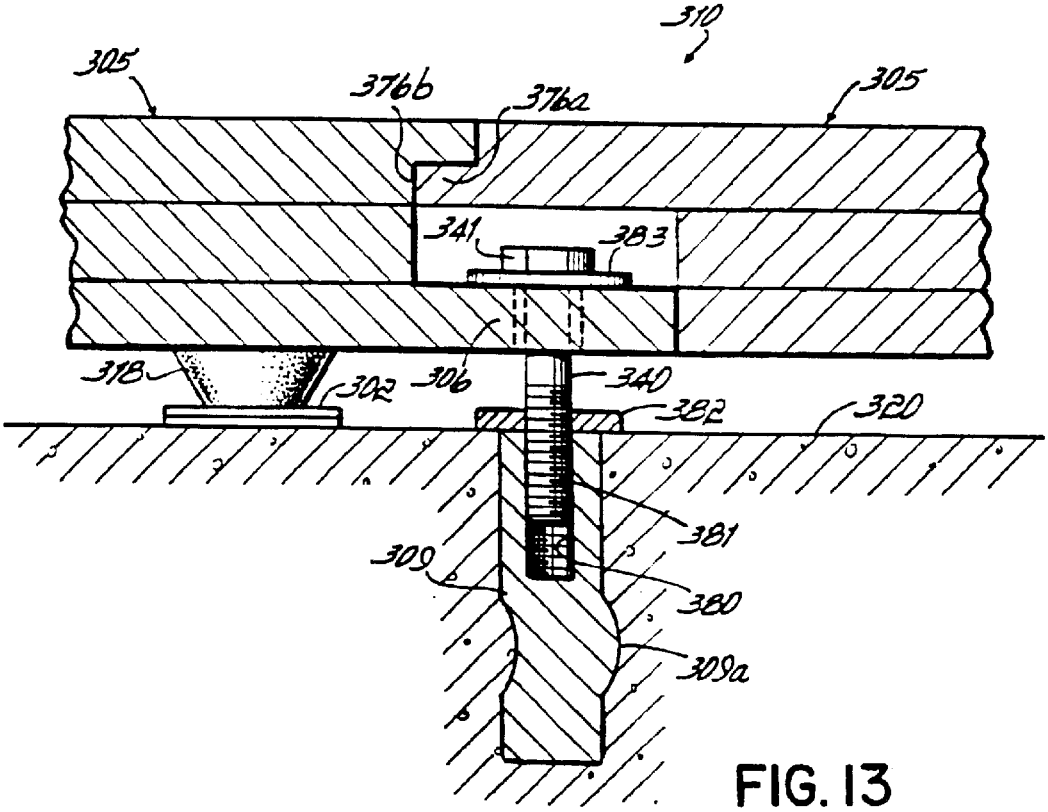
FIG. 13 shows still another embodiment of this invention, a single piece fastener arrangement for anchoring a resilient permanent floor system in a manner which allows the floor system to be removed, similar to a portable floor system.

According to still another embodiment of the invention, as shown in FIG. 13, a single piece fastener 340 may be used to anchor a permanent floor system 310 in a resilient manner, and in such a way that the normally permanent floor system 310 may be removed, if necessary. Thus, the single piece anchor pin 340 provides the floor system 310 with the advantages of a permanently installed floor and of a portable floor.

To accomplish this, the floor 310 comprises a plurality of interconnected 4'×8' sections 305, as is typical in the construction and use of portable floors. Applicant's presently pending U.S. application Ser. No. 08/008,721, filed on Jan. 21, 1993 and entitled "Resilient Portable Floor System" and applicant's already issued U.S. Pat. No. 3,967,428 issued on Jul. 6, 1976 and entitled "Portable Floor Construction" are directed to portable floors which comprise a plurality of connectable sections. This presently pending patent application and this issued patent are expressly incorporated by reference herein, in their entirety.

To form a portable floor, as disclosed in these references, the sections 305 are secured row by row, and the next row of sections 305 includes a horizontally extending subfloor tongue 376a which is horizontally received within a correspondingly shaped void or slot 376b in the previously installed row sections 305. This locks the adjacent sections 305 in a common horizontal plane.

In accordance with this embodiment of the present invention, each of the connectable sections 305 includes one or more horizontally extending brackets 306 which extend a predetermined distance above the base 320. Various versions of such brackets have been used in the past to enhance interconnection of adjacently situated sections 305. A plurality of bored 309 are drilled in the base 320 below the locations of the brackets 306, and thread-in anchors 380 are then inserted or embedded within the bores 309. The thread-in anchors 380 preferably have a curved midsection or expansion curve 309a to enhance holding force within the base 320, as shown in FIG. 13.

The single piece fastener 340 has a threaded bottom end 381 which threadably connects within the embedded anchor 380. The fastener 340 also has a jam/lock nut 382 fixed thereon a predetermined distance form a head end 341 at the top thereof. This predetermined distance corresponds to the vertical dimension between the top of the bracket 306 and the base 320. The fastener 340 is threaded into the anchor 380 recessed in the base 320 until the jam/lock nut 382 contacts the base 320 and prevents further fastening. This amount of downward threading also places the head end 341 of the fastener 340, or a washer 383 located adjacent thereto, in direct contact with the top of the bracket 306. As shown in FIG. 13, the washer 383 also bears against the top surface of the bracket 306 of both adjacently located sections 305.

Thus, the jam/lock nut 382 provides a depth stop feature for pin 340. If desired, the jam/lock nut 382 may be a washer, which is secured at the predetermined vertical position on the anchor pin 340, as by welding. The exact location of the depth stop will depend upon the vertical distance between the top of the bracket 306 and the base 320. Alternatively, the jam/lock nut 382 may be a bolt fixed in vertical position relative to the fastener 340.

FIG. 13 also illustrates a resilient pad 318 which rests on a shim 302 which contacts the base 320, as is sometimes required in the industry during installation of a permanent floor.

In this manner, as the sections 305 are interconnected to form the floor system 310, each successively connected row of sections 305 is secured to the base 320. Once installed, the interconnected sections 305 are restrained from upward vertical movement but allowed to deflect downwardly, by the thread-in fasteners 340.

If for some reason the floor 310 needs to be removed, i.e., due to construction, water damage, or even moving to a new location if the facility is rented or leased by the user, etc., the fasteners 340 can be readily unthreaded from the base 320 and the floor sections 305 are removed therefrom, row by row. When needed thereafter, the "permanent" floor 310 can be reinstalled just as easily as a portable floor.

From the above disclosure of the general principles of the present invention and the preceding detailed description of the preferred embodiments, those skilled in the art will readily comprehend the various modifications to which the present invention is susceptible. Therefore, we desire to be limited only by the scope of the following claims and equivalents thereof.

I claim:

1. A floor system supporting a wear surface above a non-portable base comprising:

an elongated attachment member with upper and lower surfaces;

at least two compressible pads contacting the lower surface and supporting the attachment member in spaced relation above the base; and a fastener arrangement for anchoring the attachment member to the base in a manner which does not hold the pads in a precompressed state when the floor system is unloaded, said fastener arrangement begin located at spaced positions along the attachment member and enabling said member to be downwardly deflectable but not upwardly raisable beyond a static position, wherein the attachment member has at least one vertically oriented bore extending therethrough from the upper surface to the lower surface, said bore having an enlarged-diameter upper portion and a reduced-diameter lower portion and said fastener arrangement extends through said bore.

2. The floor system of claim 1 and further comprising:

means for reducing frictional engagement between the fastener arrangement and the attachment member, said reducing means located within the reduced diameter lower portion of said bore.

3. The floor system of claim 2 wherein the reducing means comprises a cylindrical sleeve.

4. The floor system of claim 1 wherein the pads are secured to the lower surface of the attachment member.

5. The floor system of claim 1 wherein the pads are spaced horizontally away from said bore.

6. The floor system of claim 1 wherein the vertical distance between the top of the fastener arrangement and the upper surface is greater than the vertical compressibility of the pad.

7. The floor system of claim 1 wherein the fastener arrangement further comprises:

an anchor pin having a first end with an upper head with a diameter less than said bore upper portion and greater than said bore lower portion, a second end adapted to be extended into the bore and a depth stop located between the first and second ends, the depth stop adapted to limit downward extension of the pin into the bore, the vertical dimension of the pin from the depth stop to the upper head being approximately equal to the combined vertical dimension of the attachment member and the pads when the pads are not in a compressed state.

8. The floor system of claim 7 wherein the anchor pin has an expansion curve located adjacent the second end.

9. The floor system of claim 7 wherein the anchor pin includes an externally threaded bottom end which is received within an internally threaded anchor embedded in the base.

10. The floor system of claim 7 and further comprising:

means for reducing frictional engagement between the anchor pin and the attachment member, said reducing means located within the reduced diameter lower portion of said bore.

11. An anchored/resilient floor system supporting an upper flooring layer above a base, comprising:

a plurality of attachment members arranged in parallel rows below the upper layer to form a subfloor layer;

a plurality of compressible pads located below the attachment members to support the attachment members and the upper flooring layer in spaced relation above the base; and a fastener arrangement for anchoring each of the attachment members to the base in a manner which does not hold the pads in a precompressed state when the floor system is unloaded, said fastener arrangement enabling the members to be downwardly deflectable but not upwardly raisable beyond an initial static position, said fastener arrangement located at spaced positions along the lengths of each of the attachment members, wherein each of the attachment members has at least one bore extending vertically therethrough, each of the bores having an enlarged-diameter upper portion and a reduced-diameter lower portion, and the fastener arrangement extends through the bores.

12. The floor system of claim 11 and further comprising:

means for reducing frictional engagement between the fastener arrangement and the attachment member, said reducing means located within the reduced diameter lower portion of said bore.

13. The floor system of claim 12 wherein the reducing means comprises a cylindrical sleeve.

14. The floor system of claim 11 wherein said upper flooring layer comprises a plurality of floorboards having an upper wear surface.

15. The floor system of claim 14 wherein said upper flooring layer further comprises a layer of panels.

16. The floor system of claim 15 and further comprising:

a plurality of floorboards secured to the panels.

17. The floor system of claim 11 wherein the attachment members of the subfloor are relatively narrow and spaced from each other in parallel rows.

18. The floor system of claim 11 wherein the attachment members of the subfloor comprise panels.

19. The floor system of claim 18 wherein the panels are laid end to end in parallel rows with edges of adjacently situated rows spaced apart a predetermined distance.

20. The floor system of claim 11 wherein the fastener arrangement further comprises:

an anchor pin having a first end with an upper head with a diameter less than said bore upper portion and greater than said bore lower portion, a second end adapted to be driven into the bore and a depth stop located between the first and second ends, the vertical dimension of the pin between the depth stop and the upper head being approximately equal to the combined vertical dimension of the lower portion of the bore of the attachment member and the pads when the pads are not in a compressed state.

21. The floor system of claim 20 wherein the anchor pin includes an externally threaded bottom end which is received within an internally threaded anchor embedded in the base.

22. The floor system of claim 20 and further comprising:

means for reducing frictional engagement between the anchor pin and the attachment member, said reducing means located within the reduced diameter lower portion of said bore.

23. An anchored/resilient hardwood floor system comprising:

a top layer of floorboards;

an upper subfloor located below the top layer;

a plurality of attachment members arranged in parallel rows to form a lower subfloor located below the upper subfloor;

a plurality of compressible pads located below the attachment members and supporting the attachment members, the upper subfloor and the top layer in spaced relation above a base; and means for mechanically fastening the attachment members to the base in a manner which does not hold the pads in a precompressed state when the floor system is unloaded, said anchoring means permitting downward deflection but preventing vertical raising of the floorboards, the upper subfloor and the attachment members beyond an initial static position, the mechanically fastening means located at spaced positions along the lengths of each of the attachment members, wherein each of the attachment members has at least one bore extending vertically therethrough, each of the bores having an enlarged-diameter upper portion and a reduced-diameter lower portion, and the mechanically fastening means extends through the bores.

24. The floor system of claim 23 wherein the attachment members are narrow and elongated and located in spaced rows and the rows of attachment members are spaced at least about fifteen inches apart.

25. The floor system of claim 24 wherein the attachment members are at least eight feet long.

26. A floor system comprising:

an upper wear layer having top and bottom surfaces;

a subfloor located below the wear layer and secured thereto, the subfloor supporting the wear layer above a non-portable base;

the subfloor having a plurality of substantially vertical bores formed therethrough, each bore having an upper section and a lower section, the diameter of the upper section being greater than the diameter of the lower section;

a plurality of pads, the pads supporting the subfloor and wear layer above the base;

[a plurality of anchor pins having top and bottom ends, each anchor pin extended through one of the bores and having its respective bottom end secured to the base, the top end being of diameter greater than the bore lower section, the anchor pin further including a depth stop located between the top and bottom ends, the depth stop limiting downward movement of the anchor pin into the base during installation, the vertical dimension between the depth stop and the top end being approximately equal to the combined vertical dimension of the lower section of the bore and the pads when the pads are in an uncompressed state so that the secured anchor pins permit downward deflection of the wear layer and subfloor upon impact from above the prevent vertical raising above a static position.]

*a fastener arrangement for anchoring the subfloor to the base in a manner which does not hold the pads in a precompressed state when the floor system is unloaded, said fastener arrangement being located at spaced positions along the subfloor and enabling the subfloor to be downwardly deflectable but not upwardly raisable beyond a static position, wherein the subfloor has at least one vertical opening extending therethrough from the upper surface to the lower surface, said bore having an upper portion and a lower portion and said fastener arrangement extends through said opening.*

27. The floor system of claim 26 wherein the subfloor further comprises:

a single layer of attachment members with the bores formed therethrough.

28. The floor system of claim 26 wherein the subfloor further comprises:

an upper layer [secured to] *located above* a lower layer, the upper portions of the bores defined by the upper layer and the lower portions of the bores defined by the lower layer.

29. The floor system of claim 28 wherein the upper layer comprises panels and the lower layer comprises spaced rails.

30. The floor system of claim [29] *28* wherein the upper portions of the bores are defined by spaces between [adjacently located panels] *parallel rows* of the upper layer.

31. The floor system of claim [30] *29* wherein the panels are angled with respect to the rails, adjacently located panels are spaced from each other and not all rails include bore lower portions, thereby allowing reduced area portions of the floor to act in a free floating manner.

32. The floor system of claim [26] *41* and further comprising:

means for reducing frictional engagement between the anchor pin and the attachment member, said reducing means located within the reduced diameter lower portion of said bore.

33. A method for installing an anchored/resilient floor system to a non-portable base comprising the steps of:

forming a bore through an attachment member from a top surface thereof to a bottom surface thereof, the bore having an enlarged-diameter portion adjacent the top surface and a reduced-diameter portion adjacent the bottom surface;

securing at least two compressible pads to the bottom surface of the attachment member;

laying the attachment member on a base with the pads contacting the base;

drilling a hole in the base in alignment with the bore; and extending a fastener downwardly through the bore and driving the fastener into the hole in the base, the fastener including an upper end which cooperates with the bore lower portion to secure the attachment member to the base in a manner which permits downward deflection of the attachment member but prevents vertical raising thereof and whereby said driving step does not vertically compress the pads, thereby to retain optimum compression capability for the pads.

34. The method of claim 33 wherein the forming step further comprises:

aligning and securing two separate pieces to form the attachment member.

35. A method of reanchoring an installed floor system of the type having an upper wear layer secured to a subfloor which is supported above a base by a layer of compressible pads, the method comprising the steps of:

removing a plug of the wear layer;

forming a bore through the subfloor, the bore having an enlarged diameter upper portion and a reduced diameter lower portion;

drilling a hole in the base in alignment with the bore;

extending an anchor pin through the plug and the bore and driving the pin into the hole in the base to securely anchor a bottom end of the pin thereto, the anchor pin including a top end with a diameter greater than the bore lower portion but less than the bore upper portion, thereby to hold the subfloor to the base, the anchor pin further including a depth stop located between the top and bottom ends, the depth stop adapted to limit downward movement of the pin into the base to a predetermined vertical position during driving, the vertical dimension between the top end and the depth stop being approximately equal to the combined vertical dimension of the lower portion of the bore and the pads when the pads are in an uncompressed state, thereby to permit downward deflection of the wear layer and the subfloor upon impact to the wear layer but to prevent vertical raising thereof; and replacing the plug back into the wear layer.

36. The method of claim 35 wherein the bore is formed by drilling.

37. The method of claim 35 wherein the floor system includes at lest two subfloor layers and the lower portion and the upper portion of the bore are formed in separate layers of the subfloor.

38. A portable floor system covering a rigid non-portable base, comprising:

a plurality of portable and connectable floor sections adapted to be connected in a predetermined manner to form a floor overlying the base, each of the connectable sections further including:

an upper wear layer;

at least one subfloor layer below the upper wear layer;

a plurality of compressible pads supporting the subfloor layer and wear layer in spaced relation above the base; and a fastener arrangement for removably securing the section to the base in a manner which allows a downward vertical deflection but no upward vertical raising of the wear layer and subfloor layer.

39. The floor system of claim 38 wherein the fastener arrangement further comprises:

an anchor pin with an upper end engaging the section and a threaded lower end adapted to be received within an internally threaded anchor embedded in the base.

*40. The floor system of claim 26 wherein the opening is a bore which is circular in cross-sectional shape and has an enlarged diameter for the upper portion and a reduced diameter for the lower portion.*

*41. The floor system of claim 40 wherein the fastener arrangement further comprises:*

*a plurality of anchor pins having top and bottom ends, each anchor pin extended through one of the bores and having its respective bottom end secured to the base, the top end being of diameter greater than the bore lower section, the anchor pin further including a depth stop located between the top and bottom ends, the depth stop limiting downward movement of the anchor pin into the base during installation, the vertical dimension between the depth stop and the top end being approximately equal to the combined vertical dimension of the lower section of the bore and the pads when the pads are in uncompressed state so that the secured anchor pins permit downward deflection of the wear layer and subfloor upon impact from above but prevent vertical raising above a static position.*

*42. The floor system of claim 28 wherein the fastener arrangement further comprises:*

*a clip having spaced upper and lower sections and a midsection therebetween;*

*the upper section engaging a top surface of the lower layer of the subfloor and residing in the upper portion of the opening;*

*the midsection extending vertically through the lower portion of the opening; and*

*the lower section secured to the bore.*

*43. The method of claim 34 wherein during said extending there is a solid line or rigid material between the upper end of the fastener and the bore, thereby to permit vertical compression of the pads.*

*44. The method of claim 42 wherein the fastener is single pin with a depth stop.*

*45. The method of claim 43 wherein the single pin has a depth stop, and the depth stop, the pin itself and the upper end of the pin define the solid line of rigid material.*

* * * * *